United States Patent
Nakai et al.

(10) Patent No.: US 9,727,216 B2
(45) Date of Patent: Aug. 8, 2017

(54) PORTABLE DEVICE, METHOD OF DETECTING OPERATION, AND COMPUTER-READABLE STORAGE MEDIUM STORING PROGRAM FOR DETECTING OPERATION

(71) Applicant: KYOCERA CORPORATION, Kyoto (JP)

(72) Inventors: Yutaka Nakai, Daito (JP); Naoki Matsuo, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 41 days.

(21) Appl. No.: 14/337,766

(22) Filed: Jul. 22, 2014

(65) Prior Publication Data

US 2014/0337784 A1    Nov. 13, 2014

Related U.S. Application Data

(63) Continuation of application No. 13/126,075, filed as application No. PCT/JP2009/005638 on Oct. 26, 2009, now abandoned.

(30) Foreign Application Priority Data

Oct. 29, 2008    (JP) .................... 2008-278146

(51) Int. Cl.
*G06F 3/048*    (2013.01)
*G06F 3/0484*    (2013.01)
(Continued)

(52) U.S. Cl.
CPC .......... *G06F 3/0484* (2013.01); *G06F 1/1694* (2013.01); *G06F 3/0416* (2013.01); *H04M 2250/12* (2013.01); *H04M 2250/22* (2013.01)

(58) Field of Classification Search
CPC .... G06F 3/0484; G06F 1/1694; G06F 3/0416; H04M 2250/12; H04M 2250/22
(Continued)

(56) References Cited

U.S. PATENT DOCUMENTS 6,201,554 B1 * 3/2001 Lands .................. G06F 1/1626
                                                    345/156
6,369,794 B1    4/2002 Sakurai et al.
(Continued)

FOREIGN PATENT DOCUMENTS

JP    A-2004-228804    8/2004
JP    A-2005-092441    4/2005
(Continued)

OTHER PUBLICATIONS

Feb. 12, 2013 Office Action issued in Japanese Patent Application No. 2008-278146 (w/translation).
(Continued)

*Primary Examiner* — William Bashore
*Assistant Examiner* — Gregory A Distefano
(74) *Attorney, Agent, or Firm* — Oliff PLC

(57) ABSTRACT

A mobile telephone includes a touch panel, an acceleration sensor which detects an acceleration, and an operation detection unit which detects a predetermined operation in accordance with the acceleration detected by the acceleration sensor while an instruction made by the touch panel is being detected. For this, it is possible to detect an operation to press the touch panel while a user finger is in contact with the touch panel.

9 Claims, 8 Drawing Sheets

(51) Int. Cl.
*G06F 1/16* (2006.01)
*G06F 3/041* (2006.01)

(58) Field of Classification Search
USPC .......................................................... 715/771
See application file for complete search history.

(56) References Cited

U.S. PATENT DOCUMENTS

| | | | |
|---|---|---|---|
| 6,466,198 B1* | 10/2002 | Feinstein | G06F 1/1626 345/158 |
| 2006/0197753 A1 | 9/2006 | Hotelling | |
| 2006/0263068 A1 | 11/2006 | Jung | |
| 2008/0045207 A1 | 2/2008 | Ahn et al. | |
| 2009/0153475 A1* | 6/2009 | Kerr | H04N 5/4403 345/157 |
| 2010/0033422 A1* | 2/2010 | Mucignat | G06F 1/1626 345/156 |
| 2011/0029869 A1* | 2/2011 | McLennan | G06F 3/017 715/702 |
| 2011/0157055 A1* | 6/2011 | Tilley | G06F 3/017 345/173 |

FOREIGN PATENT DOCUMENTS

| | | |
|---|---|---|
| JP | A-2005-352924 | 12/2005 |
| JP | A-2006-178755 | 7/2006 |
| JP | A-2006-323690 | 11/2006 |
| JP | A-2008-234496 | 10/2008 |
| KR | 10-2008-0015677 A | 2/2008 |

OTHER PUBLICATIONS

Korean Office Action issued in Korean Application No. 10-2011-7012012 dated Aug. 13, 2012 (w/translation).

Japanese Office Action issued in Japanese Application No. 2008-278146 dated Sep. 25, 2012 (w/translation).

International Search Report in International Application No. PCT/JP2009/005638; dated Nov. 24, 2009 (with English-language translation).

* cited by examiner

PORTABLE DEVICE, METHOD OF DETECTING OPERATION, AND COMPUTER-READABLE STORAGE MEDIUM STORING PROGRAM FOR DETECTING OPERATION

This is a Continuation Application of U.S. patent application Ser. No. 13/126,075, filed Apr. 26, 2011, which is in turn a U.S. National Stage Application of PCT/JP2009/005638, filed Oct. 26, 2009, and claims priority of Japanese Application No. 2008-278146, filed Oct. 29, 2008. The disclosures of the prior applications are hereby incorporated by reference herein in its entirety.

TECHNICAL FIELD

The present invention relates to a portable device, a method of detecting an operation, and a computer-readable storage medium storing a program for detecting an operation, and more particularly, to a portable device including a touch panel 5, as well as a method of detecting an operation executed by such a portable device, and a computer-readable storage medium storing a program for detecting an operation executed by the same.

BACKGROUND ART

Recently, mobile phones have appeared on the market having a liquid crystal display (hereinafter referred to as an "LCD") and a touch panel 5 placed upon it. The liquid crystal display displays an image including a plurality of keys, where touch panel 5 detects an indication for one of the keys and receives the input of a number or a character (see Patent Document 1, for example). In such a mobile phone, inputting alphabet, hiragana or katakana involves allocating a plurality of characters to a key and receiving the input of one of the characters depending on the number of times the key is depressed consecutively.

While touch panel 5 is capable of detecting a position indicated, if an operation involving a plurality of indications in one and the same position is to be detected by touch panel 5, the user must perform two operations: touching touch panel 5 with a finger and then lifting the finger off the panel each time the key is depressed. As a result, operations can be troublesome.

[Patent Document 1] Japanese Patent Laid-Open No. 2005-92441

DISCLOSURE OF THE INVENTION

Problems to be Solved by the Invention

The present invention was made to solve this problem. An object of the present invention is to provide a portable device capable of detecting an operation in which a user depresses a touch panel while continuously touching the touch panel.

Another object of the present invention is to provide a method of detecting an operation that allows detection of an operation in which a user depresses a touch panel while continuously touching the touch panel.

Yet another object of the present invention is to provide a computer-readable storage medium storing a program for detecting an operation that allows detection of an operation in which a user depresses a touch panel while continuously touching the touch panel.

Means for Solving the Problems

To achieve the above object, according to an aspect of the present invention, a portable device includes: a touch panel; an acceleration sensor detecting an acceleration value; and a detecting means detecting a specified operation based on an acceleration value detected by the acceleration sensor while an indication is being detected by the touch panel.

According to another aspect of the present invention, a method of detecting an operation is performed by a portable device including a touch panel, including the steps of: detecting an acceleration value; and detecting a specified operation based on an acceleration value detected while an indication is being detected by the touch panel.

According to yet another aspect of the present invention, a program for detecting an operation stored in a computer-readable storage medium is executed by a portable device including a touch panel, for causing a computer to execute the steps of detecting an acceleration value; and detecting a specified operation based on an acceleration value detected while an indication is being detected by the touch panel.

BEST MODES FOR CARRYING OUT THE INVENTION

Figure 1:
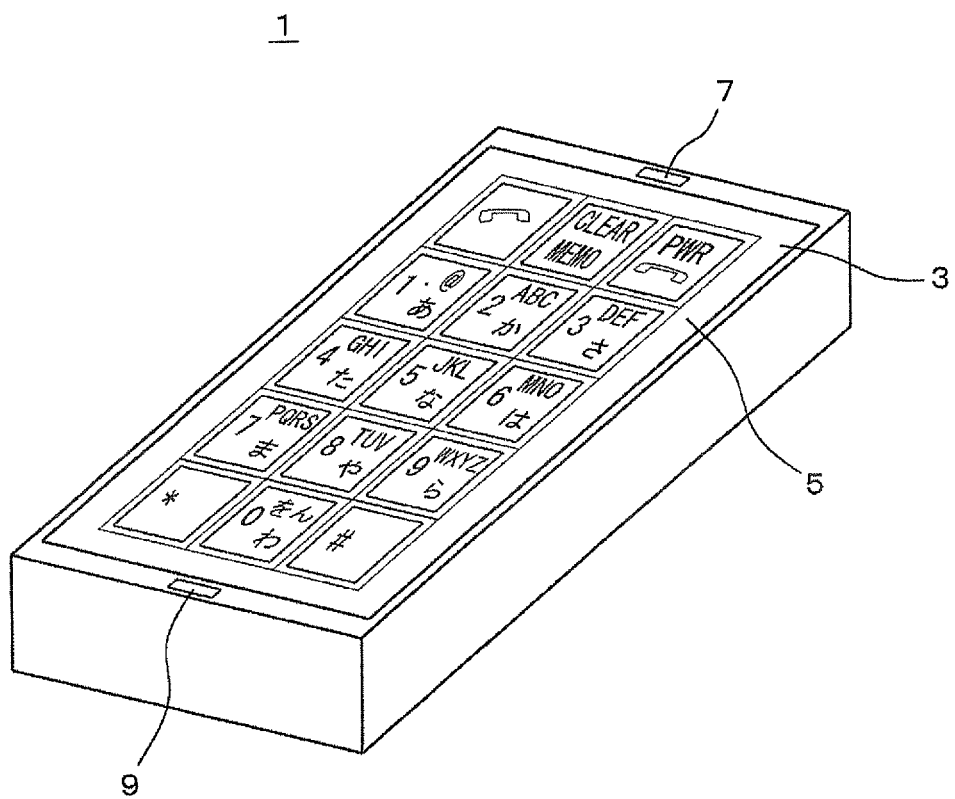
FIG. 1 is a perspective view of an external appearance of a mobile phone according to an embodiment of the present invention.

Now, an embodiment of the present invention will be described with reference to drawings. In the description below, like components are labeled with like reference characters, and have identical names and functions. Therefore, their detailed description will not be repeated.

FIG. 1 is a perspective view of an external appearance of a mobile phone according to an embodiment of the present invention. Referring to FIG. 1, a mobile phone 1, which serves as a portable device, includes on its upper side an LCD 3, a touch panel 5 placed upon LCD 3, a speaker 7 comprising a receiver, and a microphone 9. While the present embodiment shows a mobile phone 1 with an LCD 3, LCD 3 may be replaced with an organic EL (electroluminescence) display.

Touch panel 5 may be a pressure-sensitive panel, in which case changes in pressure are sensed, or may be an electrostatic panel, where electric signals generated by static electricity are sensed. If an electrostatic touch panel 5 is used, touch panel 5 may be placed on the backside of LCD 3. The present embodiment uses an electrostatic panel. When a user touches touch panel 5 with a finger, touch panel 5 detects the position touched by the user with the finger as an indicated position. While the user is touching touch panel 5 with the finger, the panel outputs the detected indicated position to a control unit 11. If the user continues to indicate one and the same position, the same indicated position is output continuously to control unit 11. It should be noted that an indicated position may be output to control unit 11 at predetermined time intervals white the user is touching touch panel 5 with the finger. In this case, too, control unit 11 can detect the user continuously touching touch panel 5 with the finger.

Figure 2:
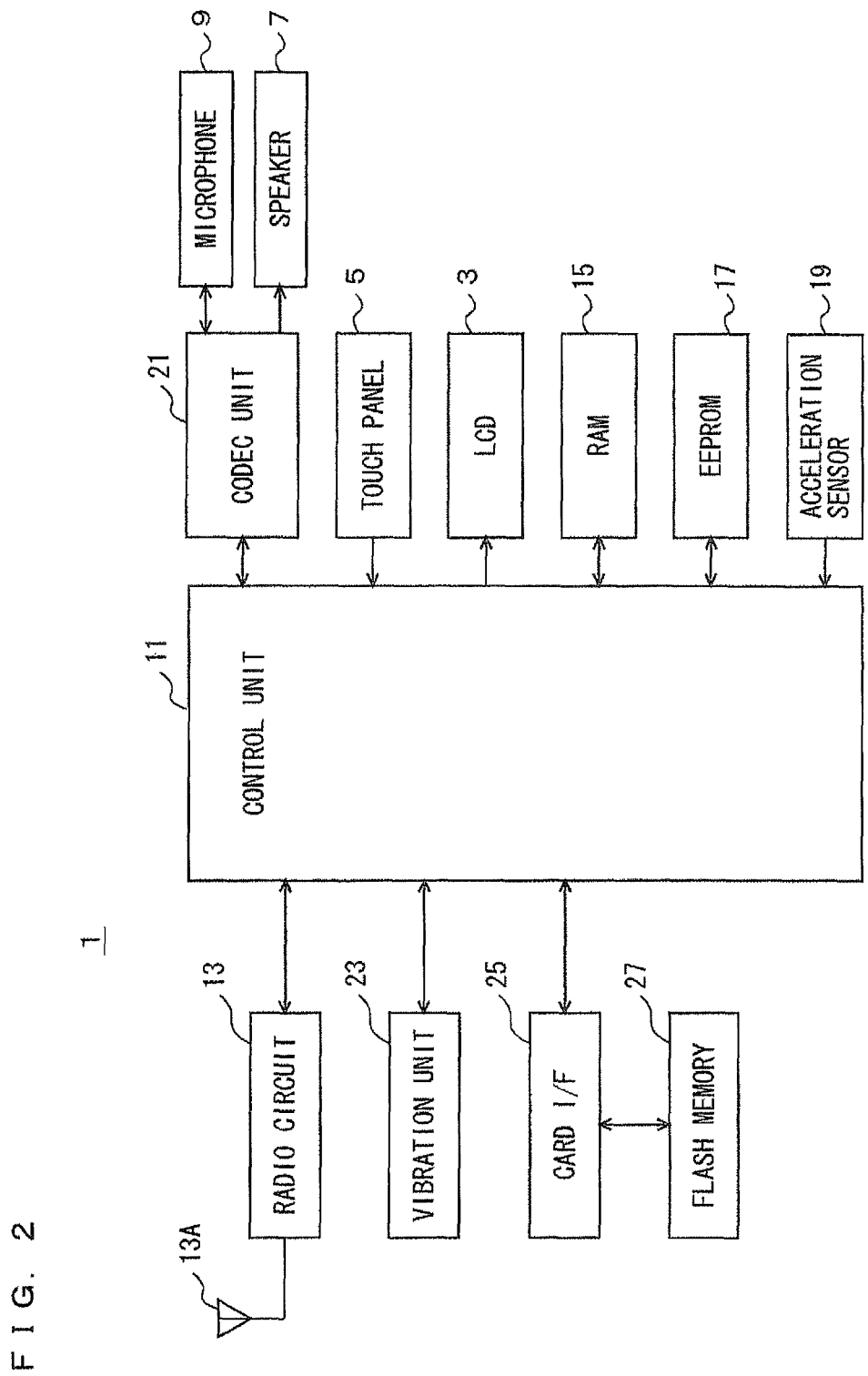
FIG. 2 is a functional block diagram showing an example of a set of functions of the mobile phone according to the present embodiment.

FIG. 2 is a functional block diagram showing an example of a set of functions of the mobile phone according to the present embodiment. Referring to FIG. 2, mobile phone 1 includes: a control unit 11 for controlling the entire mobile phone 1; a radio circuit 13 connected to an antenna 13A; a codec unit 21 for processing audio data; a microphone 9 and a speaker 7 connected to codec unit 21; an LCD 3; a touch panel 5; a RAM (random-access memory) 15 used as a working area for control unit 11; an EEPROM (electronically erasable and programmable read-only memory) 17 for storing, for example, a program to be executed by control unit 11; an acceleration sensor 19; a vibration unit 23; and a card interface (I/F) 25.

Radio circuit 13 communicates wirelessly with a device at a base station connected to the communication network. A radio signal sent by a device at a base station is received by antenna 13A. Radio circuit 13 receives the radio signal received by antenna 13A, and outputs the radio signal demodulated into an audio signal to codec unit 21. Radio circuit 13 also receives an audio signal from codec unit 21, and outputs the audio signal modulated into a radio signal to antenna 13A. The radio signal sent from antenna 13A is received by a device at a base station.

Codec unit 21 decodes an audio signal input from radio circuit 13, converts the decoded digital audio signal to an analog one, amplifies it, and outputs it to speaker 7. Codec unit 21 also receives an analog audio signal from microphone 9, converts the audio signal to a digital one, encodes it, and outputs the encoded audio signal to radio circuit 13.

A detachable flash memory 27 is mounted on card I/F 25. Control unit 11 can access flash memory 27 via card I/F 25. While in the present embodiment a program to be executed by control unit 11 is stored in EEPROM 17, a program may be stored in flash memory 27, from which the program may be read and executed by control unit 11. Such a storage medium storing a program does not have to be flash memory 27 and may be a flexible disc, a cassette tape, an optical disc (CD-ROM (compact disc-ROM)/MO (magnetic optical disc)/MD (mini-disc)/DVD (digital versatile disc)), an IC card, an optical card, or a semiconductor memory such as a mask ROM, an EPROM (erasable programmable ROM), or an EEPROM (electronically EPROM).

Also, mobile phone 1 may be connected to the Internet via radio circuit 13, where a program may be downloaded from a computer connected to the Internet and be executed by control unit 11. Such a program does not have to be a program directly executable by control unit 11, but also includes a source program, a compressed program, an encrypted program or the like.

Acceleration sensor 19 detects acceleration and outputs the detected acceleration value to control unit 11. The direction of the acceleration value detected by acceleration sensor 19 is the direction in which mobile phone 1 moves in a hand of the user who holds it when the user depresses touch panel 5. Preferably, the acceleration value detected by acceleration sensor 19 is in the direction perpendicular to the surface of touch panel 5. It should be noted that the direction perpendicular to the surface of touch panel 5 includes directions that are not exactly perpendicular due to a manufacturing error.

Figure 3:
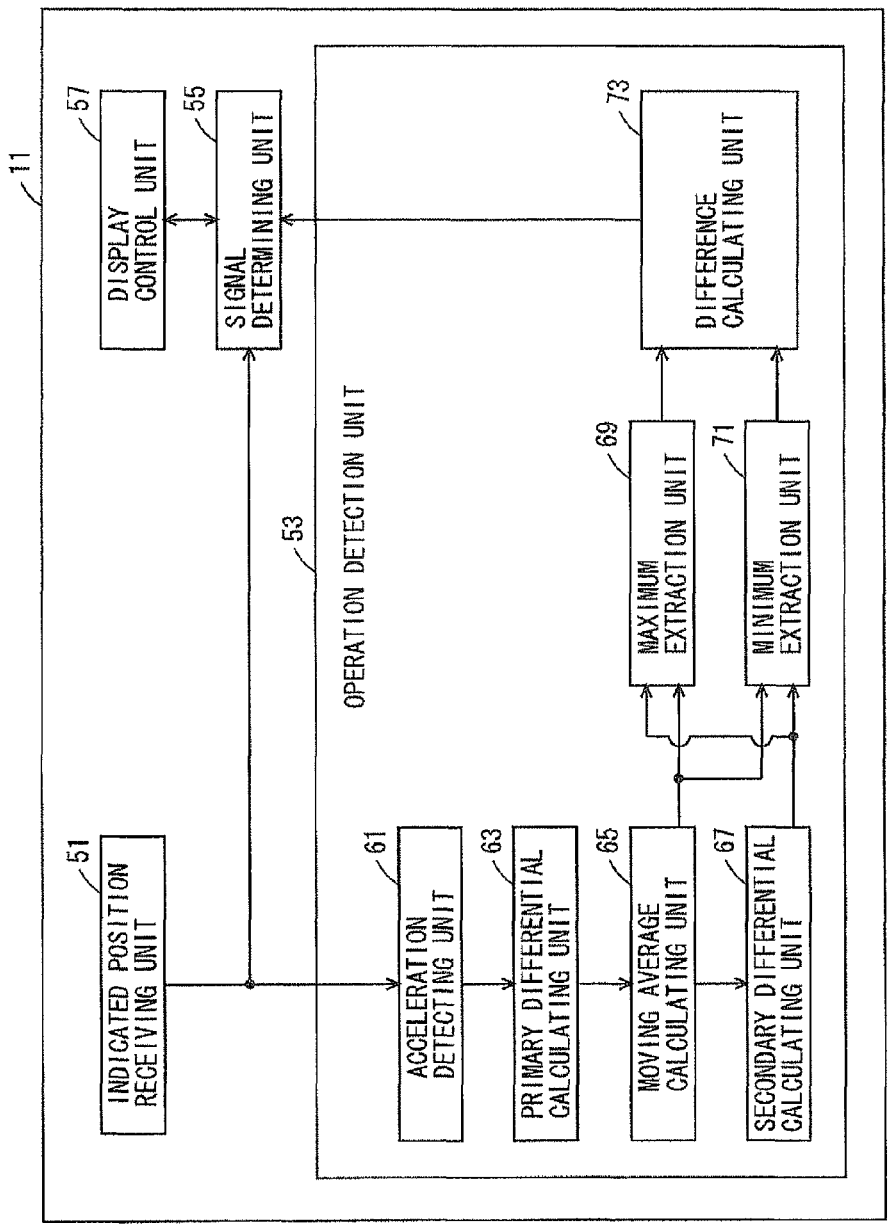
FIG. 3 is a functional block diagram schematically showing functions of the control unit.

FIG. 3 is a function block diagram schematically showing functions of the control unit. Referring to FIG. 3, control unit 11 includes an indicated position receiving unit 51 that receives an indicated position from touch panel 5, an operation detection unit 53 that detects a specified operation, a signal determining unit 55 that determines one signal out of a plurality of predetermined signals, and a display control unit 57 that controls the display on LCD 5.

Display control unit 57 controls LCD 7 and displays an image on LCD 7. For the purposes of explanation, the present embodiment describes an image including a plurality of keys displayed on LCD 7. Display control unit 57 outputs, to signal determining unit 55, key information including a pair of items: name and area, for each of the keys contained in the image displayed on LCD 7.

Indicated position receiving unit 51 receives an indicated position output from touch panel 5, and outputs the received indicated position to operation detection unit 53 and signal determining unit 55. If the user continuously touches the surface of touch panel 5, indicated position receiving unit 51 continuously outputs the indicated position to operation detection unit 53 and signal determining unit 55 as long as the user is touching touch panel 5.

While the user is holding mobile phone 1 in a hand, operation detection unit 53 detects an operation in which the user depresses touch panel 5 with a finger while continuously touching touch panel 5 with the finger. When the user depresses touch panel 5 with a finger while continuously touching touch panel 5 with the finger, the upper surface of mobile phone 1, which has touch panel 5 mounted on it, is pressed, such that mobile phone 1 is moved in space by the user's hand. This movement may be a reciprocating motion in a direction generally perpendicular to the surface of touch panel 5, or may be reciprocating motion back and forth in a circular orbit around a wrist. Since the distance of movement of such a reciprocating motion is very small, the movement of mobile phone 1 is in a direction generally perpendicular to touch panel 5. Operation detection unit 53 detects a reciprocating motion of mobile phone 1 based on an acceleration value input from acceleration sensor 19 while an indicated position is being input from indicated position receiving unit 51, in order to detect an operation in which the user depresses touch panel 5 with a finger while continuously touching touch panel 5 with a finger.

For this purpose, operation detection unit 53 includes: an acceleration detecting unit 61 that receives an acceleration value output by acceleration sensor 19; a primary differential calculating unit 63 that differentiates acceleration values; a moving average calculating unit 65 that calculates the moving average of differentiated acceleration values; a secondary differential calculating unit 67 that differentiate moving averages; a local maximum extraction unit 69 that extracts a local maximum for moving averages; a local minimum extraction unit 71 that extracts a local minimum for moving averages; and a difference calculating unit 73 that calculates the difference between a local maximum and a local minimum.

Figure 4:
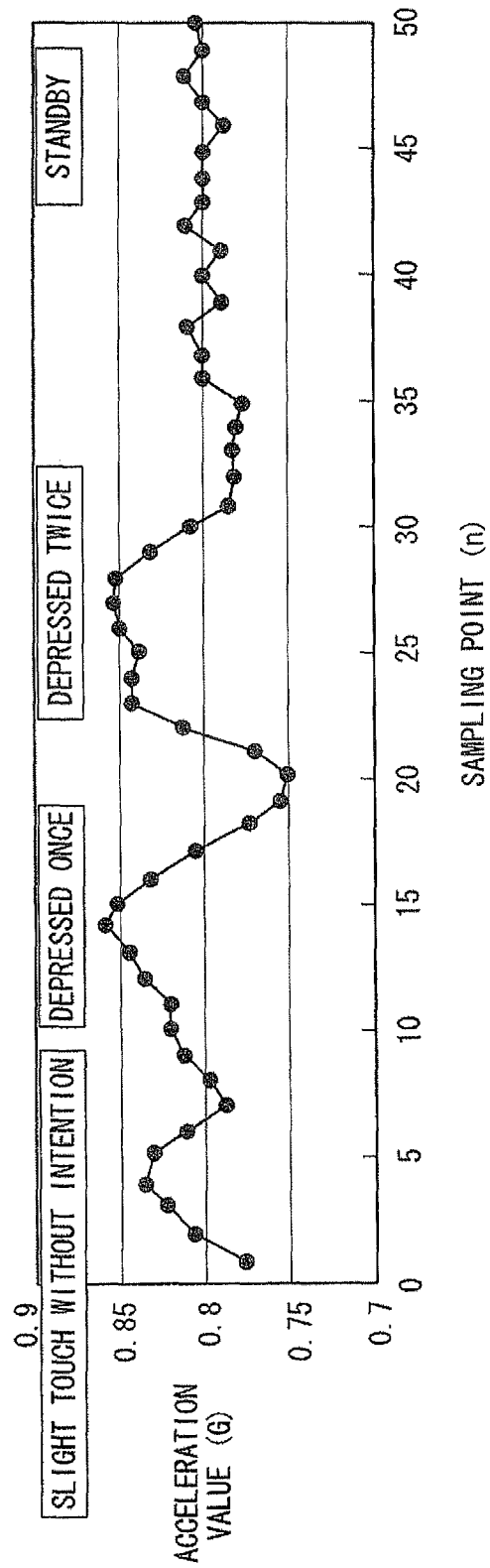
FIG. 4 shows an example of a set of acceleration values A(n).

Acceleration detecting unit 61 receives an indicated position from indicated position receiving unit 51, and an acceleration value form acceleration sensor 19. At predetermined intervals, acceleration detecting unit 61 samples an acceleration value output by acceleration sensor 19 while an indicated position is being input from indicated position receiving unit 51, and outputs the sampled acceleration value to primary differential calculating unit 63. An acceleration value output by acceleration detecting unit 61 is denoted by A(n). The variable n is a positive integer and denotes a sampling point. When no indicated position is input from indicated position receiving unit 51, acceleration detecting unit 61 resets the variable n to "1" and, when an indicated position is then input from indicated position receiving unit 51, initiates sampling and outputs an acceleration value A(n). FIG. 4 shows an example of a set of acceleration values A(n).

Primary differential calculating unit 63 differentiates acceleration values input from acceleration detecting unit 61. In this embodiment, the value obtained by differentiating acceleration values once is referred to as a primary differential value B(n). The primary differential value B(n) denotes a change in acceleration values A(n) and is suitably used for detecting a reciprocating motion of mobile phone 1. Specifically, a primary differential value B(n) can be calculated by using the following equation (1):

$$B(n)=(A(n+1)-A(n-1))/2 \quad (1)$$

Figure 5:
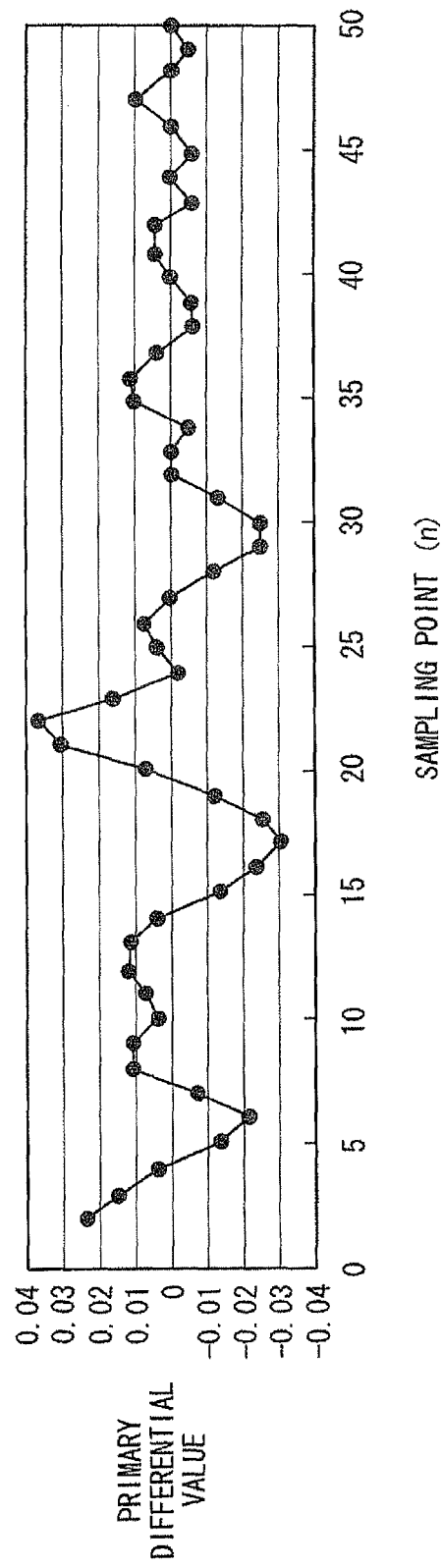
FIG. 5 shows an example of a set of primary differential values B(n).

Primary differential calculating unit 63 outputs the calculated primary differential value B(n) to moving average calculating unit 65. FIG. 5 shows an example of a set of primary differential values B(n). The primary differential values B(n) shown in FIG. 5 are primary differential values calculated based on the acceleration values A(n) shown in FIG. 4.

Moving average calculating unit 65 calculates a moving average of primary differential values B(n) for a predetermined time period. A moving average is calculated in order to remove noise. Particularly, it can remove vibrations with shorter cycles than vibrations from an operation in which the user depresses touch panel 5 with a finger. Specifically, the moving average S(n), which is the average of six consecutive primary differential values, can be calculated by using the following equation (2):

$$S(n)=(B(n-5)+B(n-4)+B(n-3)+B(n-2)+B(n-1)+B(n))/6 \quad (2)$$

Figure 6:
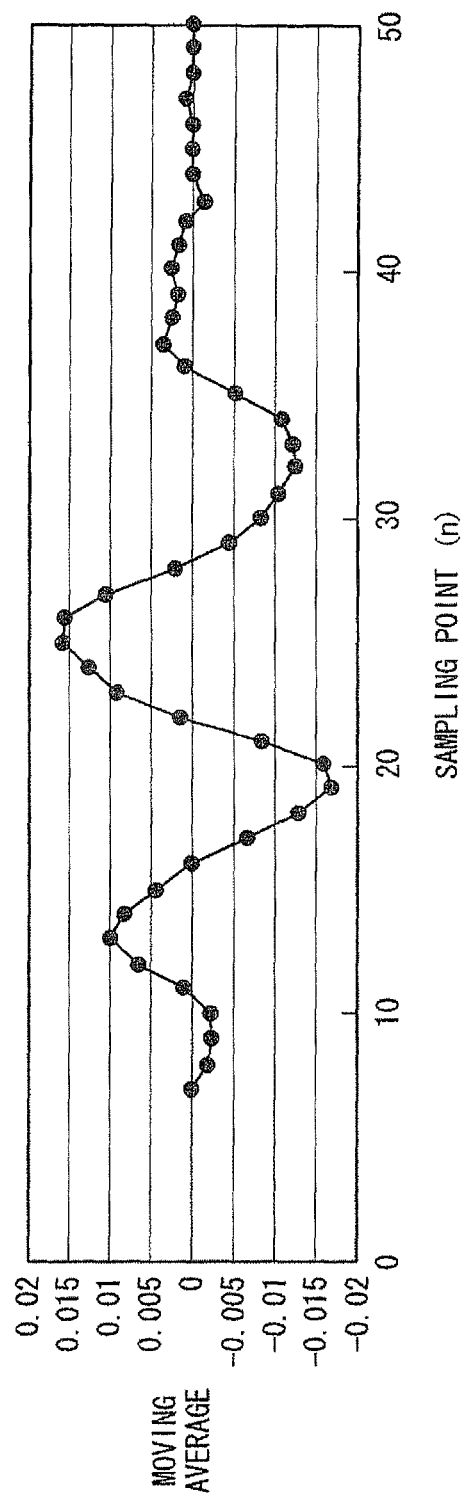
FIG. 6 shows an example of a set of moving averages S(n).

Moving average calculating unit 65 outputs the calculated moving average S(n) to secondary differential calculating unit 67, local maximum extraction unit 69 and local minimum extraction unit 71. FIG. 6 shows an example of a set of moving averages S(n). The moving averages S(n) shown in FIG. 6 are moving averages calculated from the primary differential values B(n) shown in FIG. 5.

It should be noted that, while in the present embodiment a moving average is the average of six consecutive primary differential values, the number of primary differential values that are moving-averaged can be determined by the time period suitable for the detection of changes in acceleration due to an operation in which the user depresses touch panel 5 with a finger while continuously touching touch panel 5 with the finger, and by the sampling cycle. The time period suitable for the detection of changes in acceleration due to an operation in which the used depresses touch panel 5 with a finger while continuously touching touch panel 5 with the finger can be determined by an experiment.

Secondary differential calculating unit 67 differentiates moving averages. In the present embodiment, the value obtained by differentiating moving averages once is referred to as a secondary differential value C(n). Specifically, the secondary differential value C(n) can be calculated by using the following equation (3):

$$C(n)=(S(n+1)-S(n-1))/2 \quad (3)$$

Figure 7:
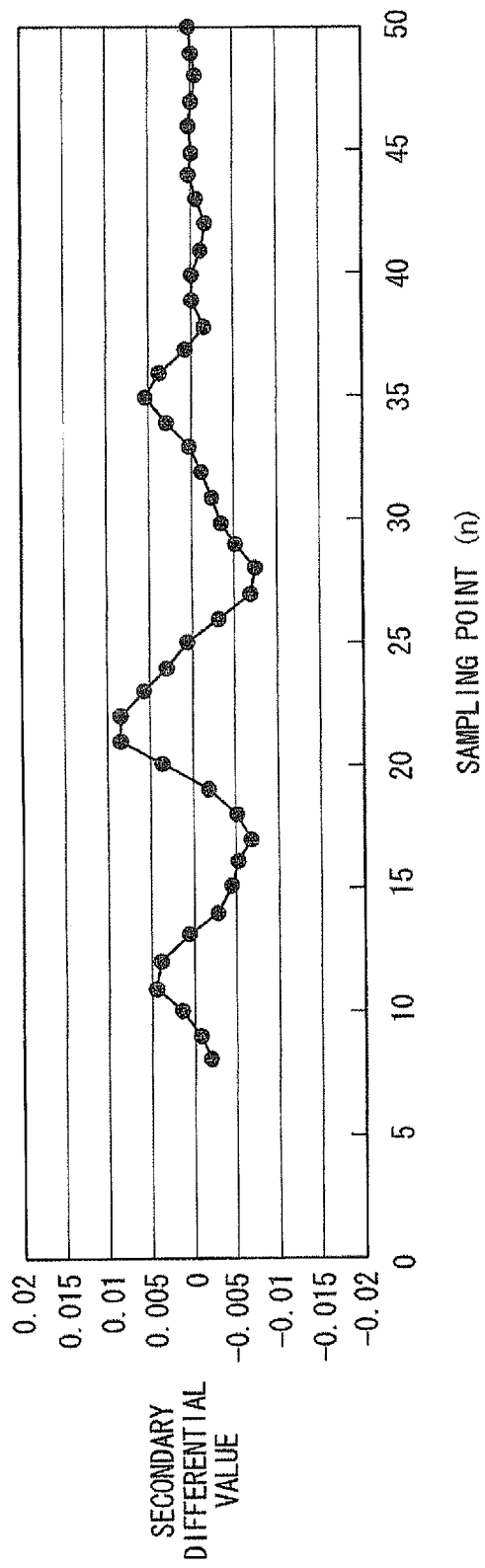
FIG. 7 shows an example of a set of secondary differential values B(n).

Secondary differential calculating unit 67 outputs the calculated secondary differential value C(n) to local maximum extraction unit 69 and local minimum extraction unit 71. FIG. 7 shows an example of a set of secondary differential values B(n). The secondary differential values C(n) shown in FIG. 7 are secondary differential values calculated based on the moving averages S(n) shown in FIG. 6. A secondary differential value C(n) is calculated in order to obtain an extremum of moving averages S(n). The sampling point at which the secondary differential value C(n) is closest to "0" indicates an extremum of moving averages S(n). Secondary differential calculating unit 67 outputs, to local maximum extraction unit 69 and local minimum extraction unit 71, the variable n that indicates the sampling point at which the secondary differential value C(n) comes closest to "0". In this embodiment, the sampling point at which the secondary differential value C(n) comes closest to "0" is denoted by N.

Local maximum extraction unit 69 receives a moving average S(n) from moving average calculating unit 65, and a sampling point N from secondary differential calculating unit 67. Local maximum extraction unit 69 extracts a large extremum from moving averages S(n). Specifically, if the moving average S(N) at the sampling point N input from secondary differential calculating unit 67 is larger than the preceding moving average S(N-1), it is regarded as a local maximum. If the moving average S(N) at the sampling point N is regarded as a local maximum, local maximum extraction unit 69 outputs the moving average S(N) as a local maximum to difference calculating unit 73.

Local minimum extraction unit 71 receives a moving average S(n) from moving average calculating unit 65, and a sampling point N from secondary differential calculating unit 67. Local minimum extraction unit 71 extracts a local minimum from moving averages S(n). Specifically, if the moving average S(N) at the sampling point N input from secondary differential calculating unit 67 is smaller than the preceding moving average S(N-1), it is regarded as a local minimum. If the moving average S(N) at the sampling point N is regarded as a local minimum, local minimum extraction unit 71 outputs the moving average S(N) as a local minimum to difference calculating unit 73.

Difference calculating unit 73 receives the local maximum from local maximum extraction unit 69, and the local minimum from the local minimum extraction unit. Difference calculating unit 73 calculates the difference between the maximum and the minimum and compares the calculated difference with a threshold value. If the calculated difference is equal to or larger than the threshold value, difference calculating unit 73 detects an operation in which the user depresses touch panel 5 with a finger while continuously touching the panel (hereinafter referred to as a "depressing operation"), and outputs to signal determining unit 55 a signal indicating that a depressing operation has been input. The threshold value is a predetermined value and can be obtained by an experiment. For example, if the user holds mobile phone 1 in a hand and depresses the surface of touch panel 5 with a finger, mobile phone 1 is moved in space by the user's hand and reciprocates in a direction generally perpendicular to the surface of touch panel 5, in which case the threshold may be the smallest absolute value of the primary differential value of the acceleration values generated at that moment.

Signal determining unit 55 receives key information from display control unit 57, an indicated position from indicated position receiving unit 51, and a signal indicating that a depressing operation has been input from difference calculating unit 73. Signal determining unit 55 detects an indication by the user of one of the keys contained in the image displayed on LCD 7 based on the key information input from display control unit 57 and the indicated position input from indicated position receiving unit 51. The description below will be made for three alphabetic characters: "A", "B" and "C" allocated to the key indicated by the user.

While an indicated position indicating the position of the key to which the three alphabetic characters are allocated is being continuously input from indicated position receiving unit 51, signal determining unit 55 counts the number of times a signal indicating that a depressing operation has been input is input from difference calculating unit 73. A key table that associates the alphabetic characters allocated to the keys contained in the image displayed on LCD 3 with the numbers of indications is stored in EEPROM 17 beforehand. Signal determining unit 55 refers to the key table to determine a character, which depends on the key identified by the indicated position and the number counted. For example, while an indicated position indicating the position of the key to which "ABC" is allocated is being continuously input, the unit selects the character "A" out of the characters "A", "B" and "C" if a signal indicating that a depressing operation has been input is input once, selects the character "B" if such a signal is input twice, and selects the character "C" if such a signal is input three times. Each time signal determining unit 55 selects a character, it determines the selected character as the character to be displayed, for example, stores it in a predetermined area of RAM 15 and displays it in a predetermined area of LCD 3.

Figure 8:
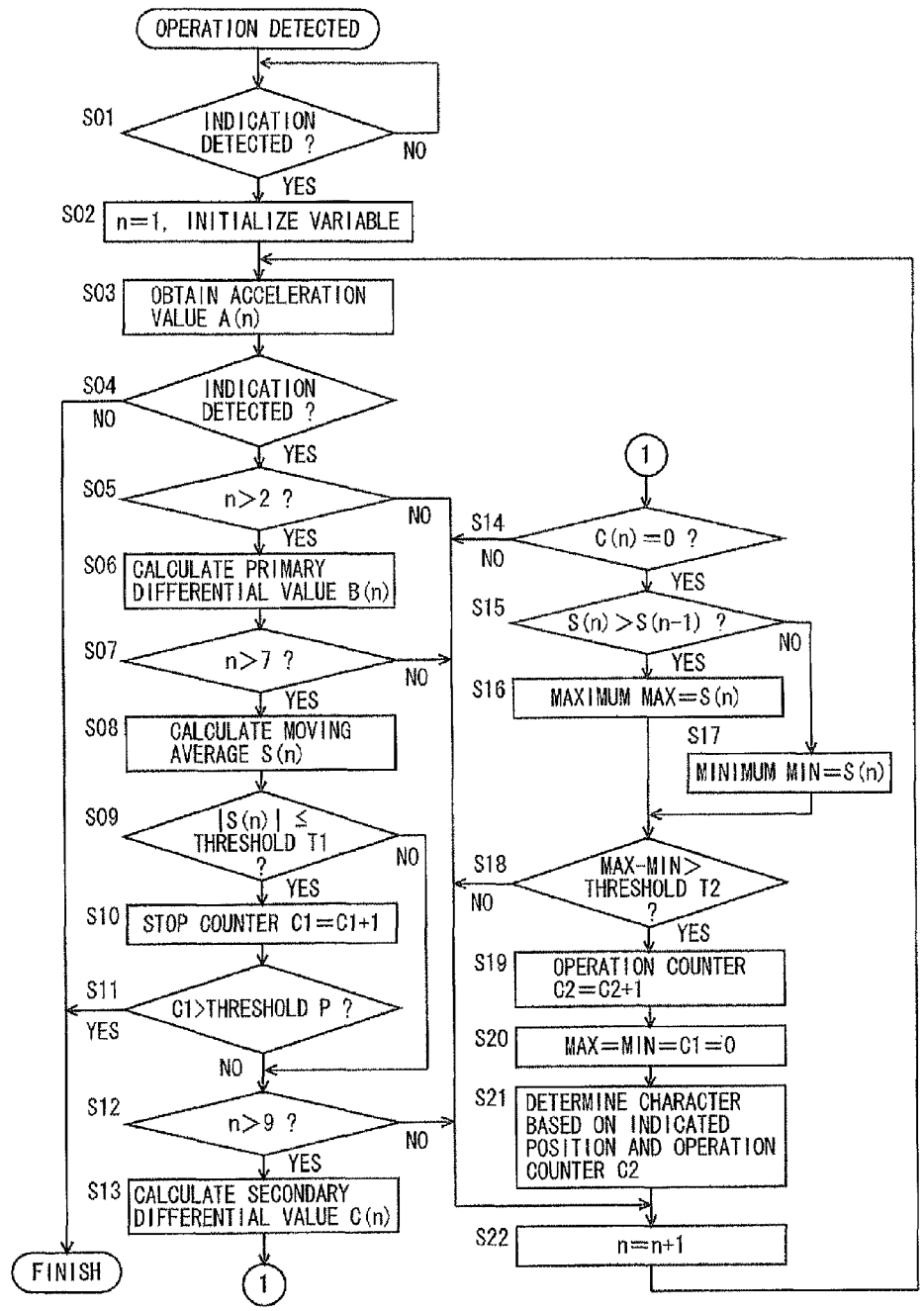
FIG. 8 is a flow chart showing an example of a flow of a process for detecting an operation.

FIG. 8 is a flow chart showing an example of a flow of a process for detecting an operation. The operation detecting process is executed by control unit 11 included in mobile phone 1, where control unit 11 executes an operation detecting program. Referring to FIG. 8, control unit 11 is on standby (NO at step S01) until it detects an indication that the user touches touch panel 5, and when it detects an indication that the user touches touch panel 5 (YES at step 01), the process proceeds to step S02. When an indicated position is input from touch panel 5, control unit 11 detects an indication that the user touches touch panel 5. In other words, the operation detecting process is executed on condition that the user touches touch panel 5.

At step S02, the variable n is set to "1" and the other variables are initialized. The variables that are initialized at this moment include the stop counter C1, the operation counter C2, the local maximum MAX, the local minimum MIN, the array of acceleration values A(n), the array of primary differential values B(n), the array of moving averages S(n), and the array of secondary differential values C(n); they are set to "0".

At step S03, the acceleration value output by acceleration sensor 19 is acquired, and the array of acceleration values A(n) is set to the acquired acceleration values.

At step S04, it is determined whether an indication that the user touches touch panel 5 has been detected, similar to step S01. If an indication by the user has been detected, the process proceeds to step S05; if not, the process ends. That is, the operation detection process detects an operation in which the user depresses touch panel 5 with a finger from the moment the user's finger gets in contact with touch panel 5 until it lifts off touch panel 5.

At step S05, it is determined whether the variable n is larger than "2". If the variable n is larger than "2", the process proceeds to step S06; if not, the process proceeds to step S22. Step S06 and the subsequent steps are performed if the variable n is larger than "2" in order to calculate a primary differential value at step S06. At step S22, the variable n is incremented by "1", and the process proceeds to step S03.

At step S06, a primary differential variable is calculated, and the array B(n) is set to calculated primary differential values. Specifically, a primary differential value is calculated by using the above equation (1) from the acceleration value A(n−1) and the acceleration value A(n+1).

At step S07, it is determined whether the variable n is larger than "7". If the variable n is larger than "7", the process proceeds to step S08; if not, the process proceeds to step S22. Step S08 and the subsequent steps are performed if the variable n is larger than "7" in order to calculate a moving average at step S08. At step S22, the variable n is incremented by "1", and the process returns to step S03.

At step S08, a moving average of primary differential values is calculated, and the array S(n) is set to calculated moving averages. Specifically, a moving average is calculated by using the above equation (2) from the primary differential values B(n−5), B(n−4), B(n−3), B(n−2), B(n−1) and B(n).

At the next step, S09, it is determined whether the absolute value of a calculated moving average S(n) is equal to or smaller than the threshold value T1. If the absolute value of a moving average S(n) is equal to or smaller than the threshold T1, the process proceeds to step S10; if not, the process proceeds to step S12. At step S10, the stop counter C1 is incremented by "1", and the process proceeds to step S11. At step S11, it is determined whether the stop counter C1 is larger than the threshold value P. If the stop counter C1 is larger than the threshold value P, the process ends; if not, the process proceeds to step S12. The stop counter C1 counts the number of times the absolute value of a moving average S(n) is equal to or smaller than the threshold value T1 in a row. If the stop counter C1 is larger than the threshold value P, the process ends; thus, the process ends when the absolute value of a moving average S(n) is equal to or smaller than the threshold value T1 P times or more often in a row. If the absolute value of a moving average S(n) is equal to or smaller than the threshold value T1, it means that acceleration remains unchanged; if this state persists for a certain period of time, it means that no operation is being input to mobile phone 1 or the mobile phone is not held in a hand and lies on a desk, for example; thus, it is determined that mobile phone 1 is not being operated.

At step S12, it is determined whether the variable n is larger than "9". If the variable n is larger than "9", the process proceeds to step S13; if not, the process proceeds to step S22. Step S13 and the subsequent steps are performed if the variable n is larger than "9" in order to calculate a secondary differential value based on moving averages at step S13. At step S22, the variable n is incremented by "1", and the process returns to step S03.

At step S13, a differential value is calculated from moving averages S(n), and the array C(n) is set to calculated differential values. Specifically, a differential value is calculated by using the above equation (3) from the moving average S(n−1) and the moving average S(n+1). In the present embodiment, a differential value that can be obtained by differentiating moving averages S(n) is denoted by a secondary differential value C(n).

At step S14, it is determined whether the secondary differential value C(n) is "0". It should be noted that the C(n) may not be "0" for some sampling points, in which case, in order to determine whether the C(n) is "0", it may be determined whether the C(n) is closest to "0". If the secondary differential value C(n) is "0", the process proceeds to step S15; if not, the process proceeds to step S22. If the secondary differential value C(n) is "0", the moving average S(n) is at a local maximum or a local minimum.

At step S15, the moving averages S(n) and S(n−1) are compared with each other. If the moving average S(n) is larger than the moving average S(n−1), the process proceeds to step S16; if not, the process proceeds to step S17. At step S16, the local maximum MAX, a variable to which the local maximum can be set, is set to the moving average S(n), and the process proceeds to step S18. On the other hand, at step S17, the local maximum MIN, a variable to which the local maximum can be set, is set to the moving average S(n), and the process proceeds to step S18.

At step S18, the difference between the local maximum MAX and the local minimum MIN is calculated, and it is determined whether that difference is larger than the threshold value T2. If the difference is larger than the threshold value T2, the process proceeds to step S19; if not, the process proceeds to step S22. At step S19, the operation counter C2 is incremented by "1". Thus, when the difference between a local maximum and a local minimum is equal to or larger than the threshold value T2, one operation in which the user depresses touch panel 5 with a finger is detected, thereby removing vibrations unrelated to a vibration that is caused by an operation in which the user depresses touch panel 5 with a finger. Then, at step S20, the variables MAX, MIN and C1 are set to "0", and the process proceeds to step S21.

At step S21, a character is determined based on an indicated position input from touch panel 5 and a value in the operation counter C2, and the process proceeds to step S22. At step S22, the variable n is incremented by "1", and the process returns to step S03. Specifically, a key indicated by the user is identified based on key information including the pair of items: name and area for each of the keys contained in the image displayed on LCD 3 and on the indicated position input from touch panel 5, and the identified key and the key table are used to determine the set of characters that have been allocated to the identified key; then, out of the set of characters, the character corresponding to the number of operations is determined. The number of operations is the value in the operation counter C2.

With reference to the acceleration values shown in FIG. 4, a first vibration at sampling points 1-8, a second vibration at sampling points 8-21 and a third vibration at sampling points 22-33 are shown. The first vibration is at its maximum at sampling point 4, and at its minimum at sampling point 7; the second vibration is at its maximum at sampling point 14, and at its minimum at sampling point 20; and the third vibration is at its maximum at sampling point 27, and at its minimum at sampling point 32.

On the other hand, referring to FIG. 6, moving averages are shown with a first vibration at sampling points 7-10, a second vibration at sampling points 11-22 and a third vibration at sampling points 23-35. The first vibration is at its maximum at sampling point 7, and at its minimum at sampling point 9. The difference between the local maximum and the local minimum is smaller than the threshold value T2, such that an operation in which the user depresses touch panel 5 with a finger is not detected.

The second vibration is at its maximum at sampling point 13, and at its minimum at sampling point 19. The difference between the local maximum and the local minimum is larger than the threshold value T2, such that an operation in which the user depresses touch panel 5 with a finger is detected. The third vibration is at its maximum at sampling point 26, and at its minimum at sampling point 32. The difference between the local maximum and the local minimum is larger than the threshold value T2, such that an operation in which the user depresses touch panel 5 with a finger is detected.

Thus, as described above, mobile phone 1, which serves as a portable device according to the present embodiment, detects an operation in which the user depresses touch panel 5 while continuously touching touch panel 5 based on an acceleration value detected while an indication on touch panel 5 is being detected, allowing the user to input an operation in which the user depresses one and the same position on the touch panel several times.

Further, a specified operation is detected when the difference between a local maximum and a local minimum of differential values of acceleration values is equal to or larger than a predetermined threshold value, allowing detecting one operation based on one cycle of vibration generated by an operation in which the user depresses touch panel 5 with continuously touching touch panel 5.

Also, the detecting means calculates a moving average of differential values output from acceleration sensor 19 for a predetermined period of time and calculates the difference between a local maximum and a subsequent local minimum of moving averages, thereby reducing noise contained in the detected acceleration values. Particularly, it may reduce a signal different from a vibration generated by an operation in which the user depresses touch panel 5 while continuously touching touch panel 5.

Further, one character is determined out of a plurality of characters based on an indicated position detected by touch panel 5 and a number of times an operation in which the user depresses touch panel 5 while continuously touching touch panel 5 is detected, thereby allowing the user to select one character from a plurality of characters by just performing an operation(s) in which the user depresses one and the same position.

Also, acceleration sensor 19 is disposed in such a way that it can detect an acceleration value in the direction perpendicular to the panel surface of touch panel 5, thereby detecting a vibration generated by an operation in which the user depresses touch panel 5 while continuously touching touch panel 5.

While the above embodiment describes a mobile phone 1 that serves as one example of a portable device, the present invention can, of course, be understood as including a method of detecting an operation for causing mobile phone 1 to perform the process for detecting an operation shown in FIG. 8, or a program for detecting an operation for causing control unit 11 (i.e. a computer) included in mobile phone 1 to perform that method.

It should be understood that the embodiments disclosed above are exemplary only and not restrictive in any way. The scope of the present invention is indicated not by the above description but by the Claims, and all the modifications equivalent in meaning to and within the Claims are intended to be included.

The invention claimed is:
1. A portable device comprising:
   a display configured to display a plurality of keys, each of a plurality of characters being allocated to any one of the plurality of keys and arranged in a predetermined order;
   a touch panel configured to detect whether each of the plurality of keys is touched;
   an acceleration sensor that detects an acceleration value; and
   a processor that detects a specified operation in which the user depresses the touch panel, based on the acceleration value detected by the acceleration sensor, wherein when the specified operation is detected one or more times by the processor while the touch panel detects that one of the plurality of keys is continued to be touched, the processor controls the display such that the display displays a character allocated to the one of the plurality of keys, the character being arranged on the one of the plurality of keys in an order corresponding to the number of times in which the user depresses the touch panel while the key is continued to be touched.

2. The portable device according to claim 1, wherein the processor detects the specified operation when a difference between a local maximum and a local minimum of differential values of acceleration values is equal to or larger than a predetermined threshold value.

3. The portable device according to claim 2, wherein the processor calculates a moving average of differential values output from the acceleration sensor for predetermined period of time to calculate a difference between the local maximum and a subsequent local minimum of calculated moving averages.

4. The portable device according to claim 1, wherein the acceleration sensor detects the acceleration value in a direction perpendicular to a panel surface of the touch panel.

5. A method of detecting an operation performed by a portable device including a display and a touch panel, comprising:
- displaying a plurality of keys, each of a plurality of characters being allocated to any one of the plurality of keys and arranged in a predetermined order;
- detecting whether one of the plurality of keys is touched, the step being performed by the touch panel;
- detecting an acceleration value;
- detecting a specified operation in which the user depresses the touch panel, based on the acceleration value detected; and
- when the specified operation is detected one or more times by the detecting step while it is detected that the one of the plurality of keys is continued to be touched, displaying a character allocated to the one of the plurality of keys, the character being arranged on the one of the plurality of keys in an order corresponding to the number of times in which the user depresses the touch panel while the key is continued to be touched.

6. The method of detecting the operation according to claim 5, wherein the step of detecting includes the step of detecting the specified operation when a difference between a local maximum and a local minimum of differential values of acceleration values is equal to or larger than a predetermined threshold value.

7. The method of detecting the operation according to claim 6, wherein the step of detecting includes the steps of:
- calculating a moving average of differential values of acceleration values for a predetermined period of time; and
- calculating a difference between the local maximum and a subsequent local minimum of calculated moving averages.

8. The method of detecting the operation according to claim 6, wherein the acceleration value detected in the step of detecting is in a direction perpendicular to a panel surface of the touch panel.

9. A non-transitory computer-readable storage medium storing a program for detecting an operation executed by a portable device including a display and a touch panel, for causing a computer to execute:
- displaying a plurality of keys, each of a plurality of characters being allocated to any one of the plurality of keys and arranged in a predetermined order;
- detecting whether one of the plurality of keys is touched, the step being performed by the touch panel;
- detecting an acceleration value;
- detecting a specified operation in which the user depresses the touch panel, based on the acceleration value detected; and
- when the specified operation is detected one or more times by the detecting step while it is detected that the one of the plurality of keys is continued to be touched, displaying a character allocated to the one of the plurality of keys, the character being arranged on the one of the plurality of keys in an order corresponding to the number of times in which the user depresses the touch panel while the key is continued to be touched.

* * * * *